United States Patent
Showalter

(10) Patent No.: US 6,203,465 B1
(45) Date of Patent: *Mar. 20, 2001

(54) TRANSFER CASE WITH FOUR-WHEEL UNDERDRIVE OPERATING MODE

(75) Inventor: Dan J. Showalter, Plymouth, MI (US)

(73) Assignee: BorgWarner Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/439,439

(22) Filed: Nov. 15, 1999

Related U.S. Application Data

(62) Division of application No. 09/191,186, filed on Nov. 13, 1998, now Pat. No. 5,984,821.

(51) Int. Cl.$^7$ .................................................. F16H 37/08
(52) U.S. Cl. ............................................................. 475/204
(58) Field of Search .................................. 475/204, 206; 180/247, 248, 251

(56) References Cited

U.S. PATENT DOCUMENTS

| | | | |
|---|---|---|---|
| 4,103,753 | * | 8/1978 | Holdeman ............................ 475/204 |
| 4,422,349 | * | 12/1983 | Matsumoto et al. .................. 475/204 |
| 4,458,557 | * | 7/1984 | Hayakawa ............................ 475/204 |
| 4,878,399 | * | 11/1989 | Kameda .............................. 475/204 |
| 5,006,098 | * | 4/1991 | Yoshinaka et al. ..................... 475/86 |
| 5,046,998 | * | 9/1991 | Frost .................................. 475/221 |
| 5,078,660 | * | 1/1992 | Williams et al. ........................ 475/84 |
| 5,106,351 | * | 4/1992 | Williams et al. ..................... 475/250 |
| 5,499,951 | * | 3/1996 | Showalter ........................... 475/204 |
| 5,984,821 | * | 11/1999 | Showalter ........................... 475/204 |

\* cited by examiner

Primary Examiner—Dirk Wright
(74) Attorney, Agent, or Firm—Brinks Hofer Gilson Lione; Greg Dziegielewski

(57) ABSTRACT

A transfer case for a four-wheel drive vehicle includes a center differential which provides a direct output in two-wheel drive and a slightly reduced speed output in four-wheel drive. In two-wheel drive, the outputs of the center differential are locked together by a clutch collar and drive torque is provided to the primary drive line only. In four-wheel drive, the clutch collar unlocks the differential and couples the output from a sun gear to a chain drive sprocket in the secondary drive line. The center differential is driven through the carrier and operates as an open differential. The ring (outer) gear drives the primary drive line and the sun (center) gear drives the secondary drive line through cooperating chain sprockets and a chain. The chain drive sprockets are of unequal size and effect a speed reduction between the drive and driven sprockets. This speed reduction is nominally the same as the speed reduction from the input to the primary output achieved through the center differential. Thus, in four-wheel drive mode, the drive (speed reduction) ratio through the drive lines is raised, improving the acceleration and pulling power of the vehicle. In two-wheel drive, more favorable fuel economy is provided with the lower drive ratio.

17 Claims, 3 Drawing Sheets

TRANSFER CASE WITH FOUR-WHEEL UNDERDRIVE OPERATING MODE

CROSS REFERENCE TO CO-PENDING APPLICATION

This application is a divisional application of Ser. No. 09/191,186, filed Nov. 13, 1998 now U.S. Pat. No. 5,984,821, granted Nov. 16, 1999.

BACKGROUND OF THE INVENTION

The invention relates generally to transfer cases for four-wheel drive vehicles and more specifically to a transfer case having a center differential which is configured to selectively provide a four-wheel underdrive operating mode.

The obvious benefits of improved traction and vehicle control achieved by four-wheel drive systems in adverse driving conditions such as snow, freezing rain, ice and even water has been known and appreciated by vehicle designers for many years. A not so obvious benefit relates to the use of four-wheel drive when towing a trailer carrying a boat, snowmobiles and the like. Here, too, the improved traction provides improved driver control and stability in adverse driving conditions. When trailer towing is viewed as a specific operational mode, additional features and requirements may be added to the list of vehicle design criteria. For example, when the vehicle weight is augmented by several hundred or several thousand pounds, a slightly higher overall drive ratio provides improved torque and thus improved acceleration.

In contrast, when the vehicle is utilized in two-wheel drive the presumption exists that neither the enhanced traction nor improved acceleration would be beneficial or necessary inasmuch as either the vehicle is not towing a trailer, the road conditions are good or both.

The present invention is directed a transfer case having a center differential which provides direct two-wheel drive and an underdrive four-wheel drive operating mode which improves vehicle performance.

SUMMARY OF THE INVENTION

A transfer case for a four-wheel drive vehicle includes a center, planetary gear differential which provides a direct output in two-wheel drive and a slightly reduced speed output in four-wheel drive. In two-wheel drive, the outputs of the center differential are locked together by a clutch collar and drive torque is provided to the primary drive line only. In four-wheel drive, the clutch collar unlocks the differential and couples the output from a sun gear to a chain drive sprocket in the secondary drive line. The center differential is driven through the carrier, operates as an open differential and is preferably configured with a 65% primary (rear), 35% secondary (front) drive line torque split. The ring (outer) gear drives the primary drive line and the sun (center) gear drives the secondary drive line through cooperating chain sprockets and a chain. The chain sprockets are of unequal size and effect a speed reduction between the drive and driven sprockets. This speed reduction is nominally the same as the speed reduction from the input to the primary output achieved through the center differential. Thus, in four-wheel drive mode, the drive ratio through the drive lines is raised and the speed reduced, improving the acceleration and pulling power of the vehicle. In two wheel drive, more favorable fuel economy is provided with the lower (direct) drive ratio. With the open center differential, skid control and torque distribution may be achieved through the vehicle's antilock or anti-skid braking system.

It is thus an object of the present invention to provide a transfer case having both direct drive and underdrive modes of operation.

It is a further object of the present invention to provide a transfer case having a center differential which may be locked out to provide direct two-wheel drive and unlocked to provide four-wheel drive at a reduced speed (underdrive) mode.

It is a still further object of the present invention to provide a transfer case having an open center differential wherein skid control is provided by, for example, an antilock braking system incorporated in the motor vehicle which is independent of the transfer case.

It is a still further object of the present invention to provide a motor vehicle transfer case wherein an open center differential and unequal chain sprockets provide drive torque to primary and secondary drive lines in a four-wheel underdrive mode to improve vehicle performance.

Further objects and advantages of the present invention will become apparent by reference to the following description and appended drawing wherein like reference numbers refer to the same component, element or feature.

DESCRIPTION OF THE PREFERRED EMBODIMENT

Figure 1:
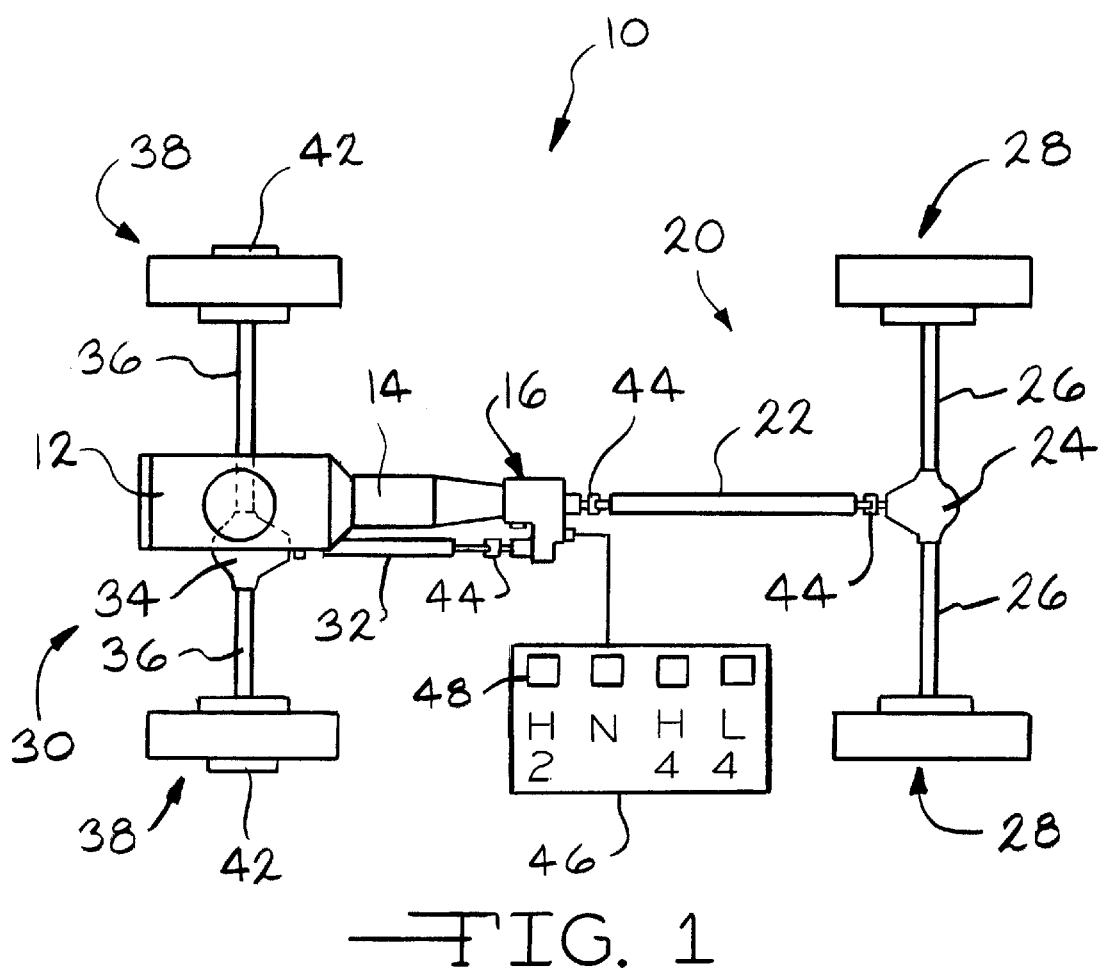
FIG. 1 is a diagrammatic, plan view of a four-wheel drive motor vehicle powertrain having a transfer case incorporating the present invention.

Referring now to FIG. 1, a four-wheel vehicle drive train is diagrammatically illustrated and designated by the reference number 10. The four-wheel vehicle drive train 10 includes a prime mover 12 which is coupled to and directly drives a transmission 14. The transmission 14 may either be an automatic or manual type. The output of the transmission 14 directly drives a transfer case assembly 16 which provides motive power to a primary or rear drive line 20 comprising a primary or rear prop shaft 22, a primary or rear differential 24, a pair of live primary or rear axles 26 and a respective pair of primary or rear tire and wheel assemblies 28.

The transfer case assembly 16 also selectively provides motive power to a secondary or front drive line 30 comprising a secondary or front prop shaft 32, a secondary or front differential assembly 34, a pair of live secondary or front axles 36 and a respective pair of secondary or front tire and wheel assemblies 38. The front tire and wheel assemblies 38 are preferably directly coupled to a respective one of the pair of front axles 36. Alternately, a pair of manually or remotely activateable locking hubs 42 may be operably disposed between the pair of front axles 36 and a respective one of the tire and wheel assemblies 38 to selectively connect same. Both the primary drive line 20 and the secondary drive line 30 may include suitable and appropriately disposed universal joints 44 which function in conventional fashion to allow static and dynamic offsets and misalignments between the various shafts and components.

An operator control console or assembly 46 is preferably disposed within easy reach of the vehicle operator and includes a switch or a plurality of pushbuttons 48 which select one of four operating modes of the transfer case assembly 16: H2—two-wheel drive by the primary drive line 20 in high gear (direct drive); N—neutral; H4—four-wheel drive through the primary and secondary drive lines 20 and 30 in reduced high gear (underdrive) and L4–four-wheel drive through the primary and secondary drive lines 20 and 30 in low gear.

The foregoing and following description relates to a vehicle wherein the rear drive line 20 functions as the primary drive line, i.e., it is engaged and operates substantially all the time and, correspondingly, the front drive line 30 functions as the secondary drive line, i.e., it is engaged and operates only part-time or in a secondary or supplemental fashion, such a vehicle commonly being referred to as a rear wheel drive vehicle.

These designations "primary" and "secondary" are utilized herein rather than "front" and "rear" inasmuch as the invention herein disclosed and claimed may be readily utilized in transmissions and transfer cases wherein the primary drive line 20 is disposed at the front of the vehicle and the secondary drive line 30 is disposed at the rear of the vehicle. Such designations "primary" and "secondary" thus broadly and properly characterize the function of the individual drive lines rather than their specific locations.

Figure 2:
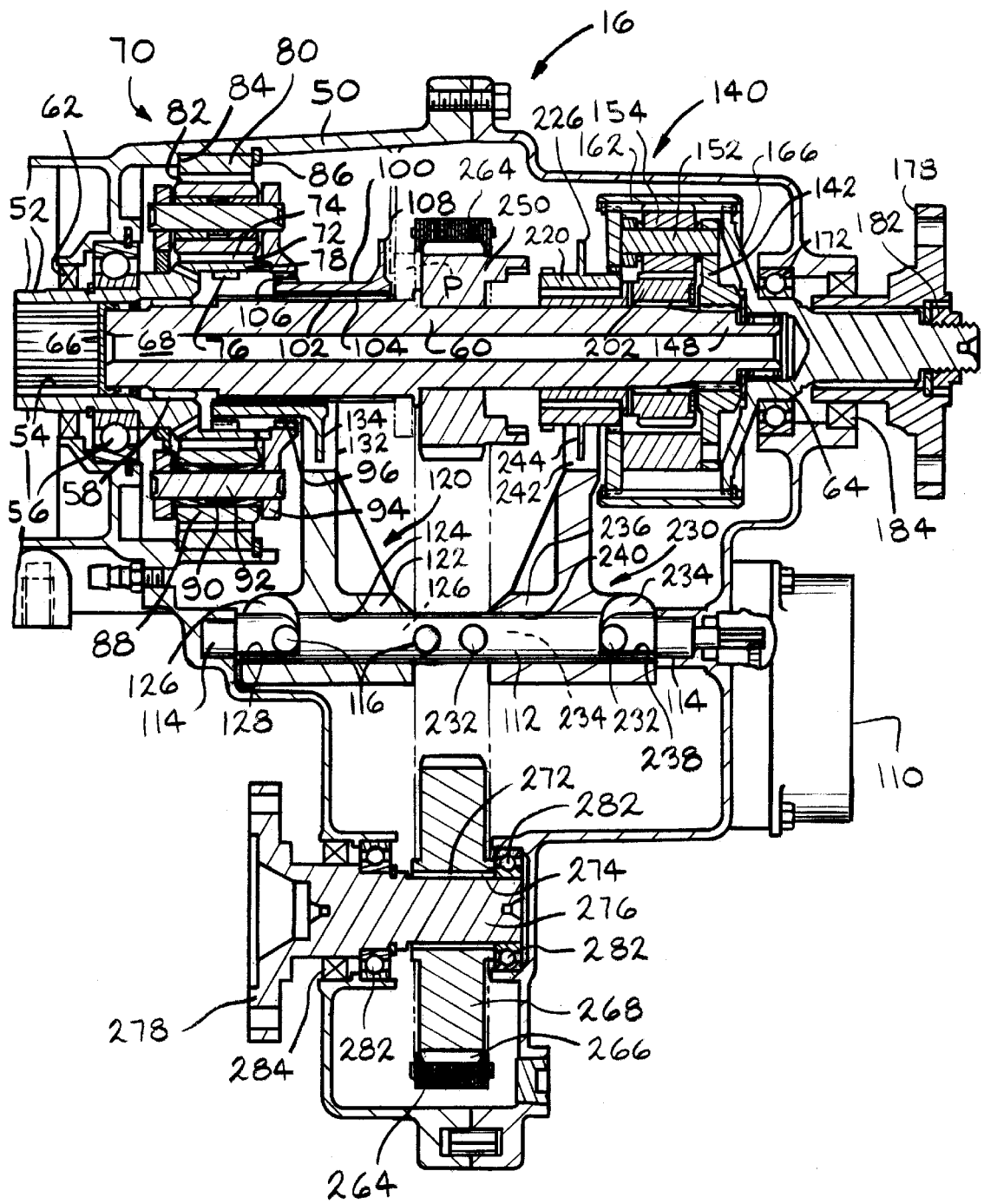
FIG. 2 is a full, sectional view of a motor vehicle transfer case incorporating a center differential according to the present invention.

Referring now to FIGS. 1 and 2, the transfer case assembly 16 incorporating the present invention includes a multiple piece, typically cast, housing assembly 50 having planar and circular sealing surfaces, openings for shafts and bearings and various recesses, shoulders, flanges, counterbores and the like to receive various components or assemblies of the transfer case 16. An input shaft 52 includes female or internal splines or gear teeth 54 or other suitable structure which drivingly couple an output of the transmission 14 illustrated in FIG. 1 to the input shaft 52. The input shaft 52 is rotatably supported externally by an anti-friction bearing such as the ball bearing assembly 56 and internally by an anti-friction bearing such as the roller bearing assembly 58. The roller bearing assembly 58 is disposed upon a portion of a stepped, intermediate shaft 60. A suitable oil seal 62, positioned between the input shaft 52 and the housing assembly 50, provides an appropriate fluid tight seal therebetween. The opposite end of the intermediate shaft 60 is supported by an anti-friction bearing such as a roller bearing assembly 64. An end cap or seal 66 closes off the end of an axial passageway 68 in the intermediate shaft 60. A gerotor pump P illustrated in phantom lines will typically be utilized to provide a flow of lubricating and cooling fluid to the axial passageway 68 which is thence distributed through a plurality of radial ports in the intermediate shaft 60 to the components of the transfer case assembly 16.

Referring now to FIG. 2, the transfer case assembly 16 includes a two-speed planetary (epicyclic) gear assembly 70 disposed generally about the input shaft 52. The planetary gear assembly 70 includes a sun gear 72 having a plurality of external gear teeth 74 and a plurality of internal splines or gear teeth 76 which are both formed on an axial extension 78 of the input shaft 52. Radially aligned with the sun gear 72 and its teeth 74 is a ring gear 80 having internal gear teeth 82. The ring gear 80 is fixedly retained within the housing assembly 50 by any suitable retaining structure such as a projection or lip 84 formed in portions of the housing assembly 50 and a cooperating snap ring 86. A plurality of pinion gears 88 are rotatably received upon a like plurality of anti-friction bearings such as roller bearings 90 which, in turn, are supported and located by a like plurality of stub shafts 92. The plurality of stub shafts 92 are mounted within and secured to a planet carrier 94. The planet carrier 94 includes a plurality of internal splines or gear teeth 96 disposed generally adjacent the internal splines or gear teeth 76 on the extension 78 of the input shaft 52. The planetary gear assembly 70 is more fully described in co-owned U.S. Pat. No. 4,440,042 which is herein incorporated by reference.

The planetary gear assembly 70 also includes a first dog clutch or clutch collar 100 defining elongate internal splines or gear teeth 102. The internal splines or gear teeth 102 of the first clutch collar 100 are slidably received upon a complementary plurality of external splines or gear teeth 104 on the intermediate shaft 60. The first clutch collar 100 thus rotates with the intermediate shaft 60 but may translate bi-directionally therealong. The first clutch collar 100 also includes external splines or gear teeth 106 on one end which are in all respects complementary to the internal splines or gear teeth 76 on the axial extension 78 of the input shaft 52 and the internal splines or gear teeth 96 on the planet carrier 94. The opposite end of the first clutch collar 100 defines a circumferentially and radially extending flange 108.

The first clutch collar 100 is capable of three positions and operational modes. In the lower portion of FIG. 2, the first clutch collar 100 is illustrated in its leftmost or direct drive position. Direct drive is achieved when the external splines or gear teeth 106 of the first clutch collar 100 engage the internal splines or gear teeth 76 on the axial extension 78 of the input shaft 52 thereby directly coupling the input shaft 52 to the intermediate shaft 60 and providing direct or high gear drive therebetween. When the first clutch collar 100 is moved to the right from the position illustrated in the lower portion of FIG. 2, to the position illustrated in the upper portion of FIG. 2, the speed reduction achieved by the planetary gear assembly 70 is engaged through engagement of the external splines or gear teeth 106 on the first clutch collar 100 with the internal splines or gear teeth 96 on the planet carrier 94. So engaged, the planetary gear assembly 70 is active and provides a speed reduction, typically in the range of from 3:1 to 4:1 between the input shaft 52 and the intermediate shaft 60. Between these two positions is a neutral position. In the center, neutral position both the input shaft 52 and the planet carrier 94 are disconnected from the intermediate shaft 60 and no power is transmitted therebetween.

The position of the first clutch collar 100 is commanded by an electric shift control motor 110. The shift control motor 110 rotates a drive shaft or shift rail 112 which is supported for rotation in the housing assembly 50 by a pair of bushings or bearings 114. The shift rail 112 includes a first pair of radially extending, spaced apart pins or cam followers 116. Disposed between the first pair of cam followers 116 is a first shift fork assembly 120. The first shift fork assembly 120 includes a first shift fork body 122 defining a through passageway 124 which receives the shift rail 112. At opposite ends of the first shift fork body 122 are complementarily configured, spaced apart helical cam surfaces 126 and axially extending discontinuities or flats 128. The helical cam surfaces 126 are configured and spaced a distance slightly less than the separation of the cam followers 116 such that rotation of the shift rail 112 axially translates the shift fork assembly 120 a limited distance along the shift rail 112. The discontinuities or flats 128 function as stops which limit rotation of the shift rail 112 in one direction. The shift fork assembly 120 also includes a yoke 132 which defines a semicircular channel or groove 134. The semicircular groove 134 is complementary to and engages a portion of the flange 108 on the first clutch collar 100 thus axially and bidirectionally repositioning the first clutch collar 100 in response to rotation of the shift rail 112, as will be readily appreciated.

It should be understood that the planetary gear assembly 70 including the first clutch collar 100 which provides dual range, i.e., high and low speed, capability of the transfer case assembly 16 is optional, that the four-wheel vehicle drive train 10 and the transfer case assembly 16 are fully functional as a single speed, direct drive unit and that the present invention may be utilized without the planetary gear assembly 70 and the dual speed range capability provided thereby.

Figure 3:
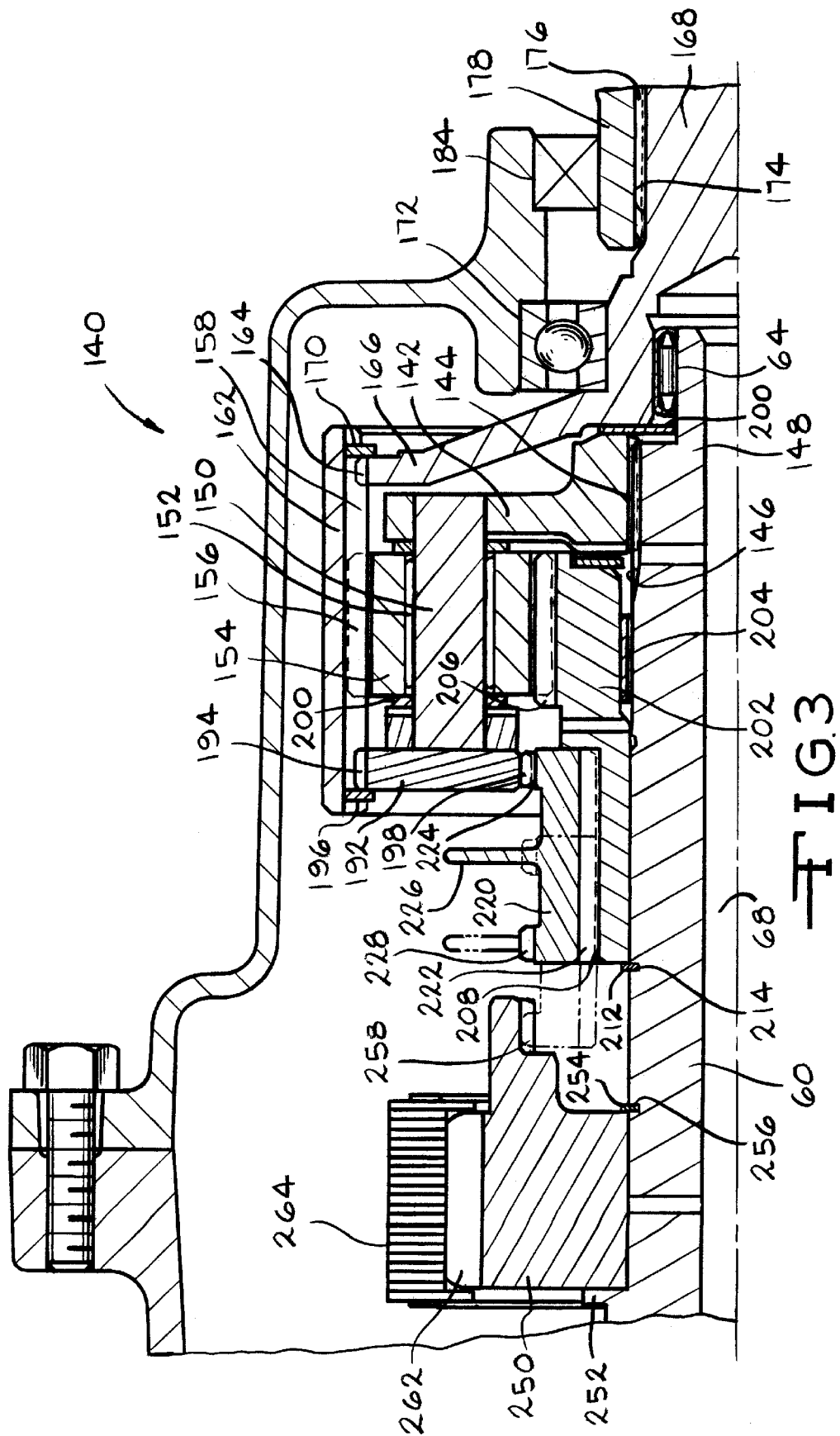
FIG. 3 is an enlarged, fragmentary sectional view of an open differential according to the present invention.

Turning now to FIGS. 2 and 3, the transfer case assembly 16 also includes a planetary gear, center differential assembly 140. The center differential assembly 140 is preferably also an epicyclic gear train device and includes a planet carrier 142 having internal splines or gear teeth 144 which engage and are driven by complementarily configured external splines or gear teeth 146 formed on a stepped, terminal portion 148 of the intermediate shaft 60. The planet carrier 142 receives a plurality, preferably three, axially extending stub shafts 150 which support needle bearing assemblies 152 which rotatably receive a plurality of pinion or planet gears 154. The plurality of pinion or planet gears 154 each include gear teeth 156 which are in constant mesh with internal gear teeth 158 formed on the interior of a ring gear annulus 162. The ring gear annulus 162 is engaged by, coupled to and supported by a plurality of external gear teeth 164 formed on the periphery of an obliquely extending circular member 166 which constitutes a portion of a primary output shaft 168. A snap ring 170 seated in a circumferential groove in the gear teeth 158 retains the circular member 166 of the output shaft 168 within the ring gear annulus 162.

As noted above, the roller bearing assembly 64 rotatably supports the stepped, terminal portion 148 of the intermediate shaft 60 in a counterbore in the primary output shaft 168. The primary output shaft 168 is preferably rotatably-supported upon an anti-friction bearing such as a ball bearing assembly 172. The primary output shaft 168 may include external splines or gear teeth 174 which mate with internal splines or gear teeth 176 in an output flange 178 or other output or driveline structure. The output flange 178 is preferably secured to the primary output shaft 168 by a suitable retainer such as a nut 182. An oil seal 184 provides a fluid tight seal between the flange 178 and the housing 50 of the transfer case assembly 16.

At the opposite end of the ring gear annulus 162 from the obliquely extending circular member 166 is a circular end plate 192. The circular end plate 192 includes external gear teeth 194 which are complementary to and engage the internal gear teeth 158 on the ring gear annulus 162. The circular end plate 192 is disposed adjacent the planet carrier 142 and is axially restrained by a snap ring 196 received within a suitable circumferential groove in the gear teeth 158. The circular end plate 192 also includes a plurality of internal splines or gear teeth 198. It will be appreciated that various friction reducing flat washers 200 may be disposed between components of the center differential assembly 140 which rotate at different speeds.

A drive sleeve 202 is freely rotatably disposed about the intermediate shaft 60. A friction reducing bushing 204 may be disposed between the drive sleeve 202 and the intermediate shaft 60, if desired. The drive sleeve 202 includes a plurality of external gear teeth 206 which are in constant mesh with the gear teeth 156 of each of the plurality of pinion or planet gears 154. The drive sleeve 202 and its external gear teeth 206 thus function as a sun gear, cooperating with the pinion or planet gears 154 which, in turn, cooperate with the gear teeth 158 of the ring gear annulus 162 to form a planetary or epicyclic gear train which, as arranged, functions as an open center differential.

The drive sleeve 202 also includes a region of external splines or gear teeth 208 which are disposed generally opposite the external gear teeth 206 which form the sun gear. The drive sleeve 202 is retained and axially positioned by a snap ring 212 which is received within a suitable circumferential groove 214 formed in the intermediate shaft 60. Axially, bi-directionally slidable upon the external splines or gear teeth 208 of the drive sleeve 202 is a second dog clutch or clutch collar 220. The second clutch collar 220 includes internal splines or gear teeth 222 which are complementary to and drivingly engaged by the external splines or gear teeth 208 on the drive sleeve 202. The end of the second clutch collar 220 more proximate the center differential assembly 140 includes a first set of external splines or gear teeth 224 which are in all respects complementary to and engageable with the internal splines or gear teeth 198 on the circular end plate 192.

The second clutch collar 220 includes a medially disposed, radially and circumferentially extending flange 226. The second clutch collar 220 also includes a second set of external splines or gear teeth 228 disposed at the end of the second clutch collar 220 opposite the first set of external splines or gear teeth 224.

As illustrated in FIG. 2, a second shift fork assembly 230 is also disposed upon the shift rail 112. A second pair of pins or cam followers 232 engage spaced apart helical cams 234 on opposite ends of a second shift fork body 236. The helical cams 234 may include axially extending discontinuities or flats 238. The second shift fork body 236 also includes a through passageway 240 adapted to receive the shift rail 112. The second shift fork assembly 230 also includes a yoke 242 defining a semi circular groove 244 which receives a portion of the flange 226 of the second clutch collar 220.

Returning on FIGS. 2 and 3, a smaller chain drive sprocket 250 is freely rotatably disposed upon the intermediate shaft 60. The smaller chain drive sprocket 250 is located and axially restrained between a shoulder 252 formed on the intermediate shaft 60 and a snap ring 254 which is seated within a complementarily configured circumferential groove 256. The smaller chain drive sprocket 250 include internal splines or gear teeth 258 which are complementary to and may be selectively engaged by the second plurality of external splines or gear teeth 228 on the second shift collar 220. The smaller chain drive sprocket 250 also includes a plurality of chain drive teeth 262 which drivingly engage a drive chain 264. The drive chain 264, in turn, drivingly engages chain teeth 266 formed about the periphery of a larger driven chain sprocket 268. The larger driven chain sprocket 268 preferably includes internal splines or gear teeth 272 which are complementary to and engage external splines or gear teeth 274 on a secondary output shaft 276. The secondary output shaft 276 is preferably supported upon a pair of spaced apart anti-friction bearings such as the ball bearing assemblies 282. The secondary output shaft 276 includes a flange 278 or other structure compatible with the related, driven components of the secondary drive line 30. An oil seal 284 provides a suitable fluid tight seal between the secondary output shaft 276 and the housing 50 of the transfer case assembly 16.

The operation of the transfer case assembly 16 and specifically the center differential assembly 140 in the two-wheel drive, high gear (direct drive) mode and the four-wheel drive, reduced speed (underdrive) mode according to the present invention will now be described. In FIG. 3, the second clutch collar 220 is illustrated in the two-wheel, direct drive operating mode. In this operating mode, the second clutch collar 220 is in its right-most position with the external splines or gear teeth 224 of the second clutch collar 220 engaged with the internal splines or gear teeth 198 on the circular end plate 192. Since the second clutch collar 220, through the drive sleeve 202 is rotationally connected to the sun gear teeth 206 and thence to the pinions or planet gears 154, the center differential assembly 140 is effectively locked and drive torque entering the center differential assembly 140 through the carrier 142 is provided to the primary output shaft 168 without differentiation, speed increase or speed reduction.

In the four-wheel, underdrive operating mode, the second shift collar 220 is translated by the shift control motor 110 to the left-most position illustrated in phantom lines in FIG. 3. Drive torque is introduced into the center differential assembly 140 from the intermediate shaft 60, through the carrier 142 and the associated pinion or planet gears 154. The second shift collar 220 is engaged with and drives the smaller chain drive sprocket 250. The center differential assembly 140 is thus unlocked and may achieve differentiation between the primary output shaft 168 and the smaller chain drive sprocket 250. Preferably, the center differential assembly 140 is configured to provide a 65/35 torque split between the primary drive line 20 and the secondary drive line 30.

In this operating mode, speed reduction is achieved through the center differential assembly 140 to the primary output shaft 168 relative to the direct drive operating mode discussed above. A corresponding speed reduction is achieved through the ratio of the gear teeth on the smaller chain drive sprocket 250 and the larger driven chain sprocket 268. For example, the smaller chain drive sprocket 250 may include thirty-one teeth whereas the larger driven chain sprocket 268 may include forty-one teeth thereby achieving a speed reduction ratio of 1.1323 to 1 which, when combined with the ratio between the pinions or planet gears 154 and the sun gear teeth 206 on the drive sleeve 202 achieves the same nominal reduction as that through the pinions or planet gears 154, the ring gear annulus 162 and the primary output shaft 168. Reduction ratios between the smaller chain drive sprocket 250 and the larger driven chain sprocket 268 in the range of 1.15 to 1.50 to 1.00 are suitable.

While this ratio may be varied to accommodate various vehicle sizes, weights and horsepowers, the overall operating reduction ratio in the underdrive mode of 1.13 to 1 has been found satisfactory. Ratios in the range of about 1.05 to 1 to 1.25 to 1 are also considered suitable. This reduction (underdrive) ratio effectively increases the axle ratios of the front and rear differentials from, for example, 3.31 to 1 to 3.73 to 1, thereby improving the performance and towing capability of the vehicle. Of course, when the vehicle is shifted back to two-wheel, direct drive, it performs in accordance with its standard, for example, 3.31 to 1 axle ratio as will be readily appreciated.

As noted above, the center differential assembly 140 providing an underdrive speed range in high gear may be utilized with or without the two speed planetary gear assembly 70 and the high (direct) and low (reduced) speed ranges it provides. Furthermore, the center differential assembly 140 according to the present invention in conjunction with the primary differential 24 and the secondary differential 34 provide complete differentiation, i.e., permit independent variable speeds among the tire and wheel assemblies 28 and 38. Accordingly, the antilock or antiskid brake control system of the associated motor vehicle may be utilized to control and limit torque distribution to the various tire and wheel assemblies 28 and 38 in order to reduce wheel spin and improve vehicle performance and handling, particularly in adverse weather and driving conditions.

The foregoing disclosure is the best mode devised by the inventor for practicing this invention. It is apparent, however, that apparatus incorporating modifications and variations will be obvious to one skilled in the art of transfer cases and motor vehicle drive lines. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. A transfer case for a four-wheel drive vehicles comprising, in combination,
an input,
a first output for driving a first drive line,
a second output for driving a second drive line, said second output including first and second chain sprockets having disparate numbers of teeth and a chain engaging said chain sprockets,
a planetary center differential having a carrier driven by said input, a plurality of planet gears rotatably disposed in said carrier, a ring gear engaging by said planet gears and driving said first output and an output sleeve having teeth engaging said planet gears, and
a clutch collar rotationally coupled to said output sleeve and translatable to a first position operably engaging said ring gear and a second position operably engaging said second output.

2. The transfer case of claim 1 whereby said first position of said clutch collar locks said center differential and said second position provides an underdrive operating mode.

3. The transfer case of claim 1 wherein said chain sprocket engaged by said clutch collar includes fewer teeth than said other chain sprocket.

4. The transfer case of claim 1 further including a speed reduction assembly having a first, direct drive output, a second, reduced speed output and a clutch for selectively engaging one of said outputs to said input.

5. The transfer case of claim 1 further including a shift rail, a shift fork received on said shift rail and engaging said clutch collar and a drive motor for moving said clutch collar.

6. The transfer case of claim 1 wherein said first position of said clutch collar provides direct drive and said second position of said clutch collar provides a reduced speed drive.

7. A transfer case for a four-wheel drive vehicle comprising, in combination,
an input for receiving drive energy,
a first output for driving a first drive line,
a second output for driving a second drive line, said second output including first and second chain sprockets having disparate numbers of teeth and a chain engaging said chair sprockets,
a planetary center differential having a carrier operably coupled to said input, a plurality of planet gears rotatably disposed in said carrier, a ring gear engaging said planet gears and operably coupled to said first output and an output sleeve having teeth engaging said planet gears, and a clutch collar rotationally coupled to said output sleeve and translatable no a first position operably engaging said ring gear and a second position operably engaging said second output.

8. The transfer case of claim 7 whereby said first position of said clutch collar provides direct, two-wheel drive and said second position of said clutch collar provides four-wheel drive underdrive.

9. The transfer case of claim 7 wherein said chain sprocket engaged by said clutch collar includes fewer teeth than said other chain sprocket.

10. The transfer case of claim 9 wherein said chain sprocket engaged by said clutch collar includes 31 teeth and said other chain sprocket includes 41 teeth.

11. The transfer case of claim 7 further including a speed reduction assembly having a first, direct drive output, a second, reduced speed output and a clutch for selectively engaging one of said outputs to said input.

12. The transfer case of claim 7 wherein said first position of said clutch collar provides direct drive and said second position of said clutch collar provides a reduced speed drive.

13. A transfer case for a four-wheel drive vehicle comprising, in combination, an input, a first output for driving a first drive line, a second output for driving a second drive line, said second output including a speed reducing assembly, said speed reducing assembly includes a first chain sprocket having a first number of teeth and a second chain sprocket having a second number of teeth greater than said first number of teeth, a planetary differential having a carrier driven by said input, a plurality of planet gears rotatably disposed in said carrier, a ring gear engaging by said planet gears and driving said first output and an output sleeve having teeth engaging said planet gears, and a clutch member driven by said output sleeve and translatable to a first position operably engaging said ring gear and a second position operably engaging said second output, whereby said first position of said clutch member provides direct, two-wheel drive and said second position of said clutch member provides four-wheel drive underdrive.

14. The transfer case of claim 13 wherein said first number of teeth is 31 and said second number of teeth is 41.

15. The transfer case of claim 13 wherein said underdrive ratio is between about 1.05 to 1.25 to 1.

16. The transfer case of claim 13 further including a planetary speed reduction assembly having a first, direct drive output, a second, reduced speed output and a clutch for selectively engaging one of said outputs to said input member.

17. The transfer case of claim 13 further including a shift rail, a shift fork received on said shift rail and engaging said clutch member and a drive motor for moving said clutch member.

* * * * *